(12) United States Patent
Molchan et al.

(10) Patent No.: US 12,256,744 B2
(45) Date of Patent: Mar. 25, 2025

(54) FILLED SNACK PRODUCT WITH SPACED FILLING LINES AND METHOD OF MAKING THE SAME

(71) Applicant: Kellanova, Battle Creek, MI (US)

(72) Inventors: James Edward Molchan, Galesburg, MI (US); Barb Garter, Shelbyville, MI (US); Paul Edward Nowaczyk, Portage, MI (US)

(73) Assignee: KELLANOVA, Battle Creek, MI (US)

( * ) Notice: Subject to any disclaimer, the term of this patent is extended or adjusted under 35 U.S.C. 154(b) by 354 days.

(21) Appl. No.: 16/145,634

(22) Filed: Sep. 28, 2018

(65) Prior Publication Data

US 2019/0029273 A1    Jan. 31, 2019

Related U.S. Application Data

(60) Division of application No. 14/790,638, filed on Jul. 2, 2015, now Pat. No. 10,111,443, which is a continuation of application No. 12/850,805, filed on Aug. 5, 2010, now abandoned.

(60) Provisional application No. 61/232,086, filed on Aug. 7, 2009.

(51) Int. Cl.
| | |
|---|---|
| *A21D 13/24* | (2017.01) |
| *A21D 13/14* | (2017.01) |
| *A21D 13/19* | (2017.01) |
| *A21D 13/31* | (2017.01) |
| *A21D 13/47* | (2017.01) |
| *A23L 7/122* | (2016.01) |
| *A23P 30/20* | (2016.01) |

(52) U.S. Cl.
CPC ............ *A21D 13/24* (2017.01); *A21D 13/14* (2017.01); *A21D 13/19* (2017.01); *A21D 13/31* (2017.01); *A21D 13/47* (2017.01); *A23L 7/122* (2016.08); *A23P 30/20* (2016.08)

(58) Field of Classification Search
CPC ........ A21D 13/19; A21D 13/24; A21D 13/31; A21D 13/47; A21D 13/0022; A21D 13/14; A23L 7/122; A23P 30/20
USPC .................................................. 426/94, 103
See application file for complete search history.

(56) References Cited

U.S. PATENT DOCUMENTS

| | | | |
|---|---|---|---|
| 3,467,029 A * | 9/1969 | Eugene | A21C 9/04 426/283 |
| 3,494,302 A | 2/1970 | Wolf et al. | |
| 4,167,386 A * | 9/1979 | Mallay | B23P 15/16 425/463 |
| 4,244,974 A | 1/1981 | Minami et al. | |
| 4,268,532 A | 5/1981 | Bernard | |
| 4,382,970 A | 5/1983 | Sorensen | |
| 4,493,860 A | 1/1985 | Callahan | |
| 4,574,090 A * | 3/1986 | Paulucci | A21D 13/41 426/439 |
| 4,614,489 A | 9/1986 | Juravic | |
| 4,797,291 A | 1/1989 | Pierce et al. | |
| 4,888,192 A | 12/1989 | Ramnarine | |
| 4,889,733 A | 12/1989 | Willard et al. | |
| 4,899,650 A | 2/1990 | Larsen | |
| 4,900,572 A | 2/1990 | Repholz et al. | |
| 4,959,235 A | 9/1990 | Aquino et al. | |
| 4,992,285 A | 2/1991 | Larsen | |
| 5,000,968 A | 3/1991 | Szwerc et al. | |
| 5,019,404 A | 5/1991 | Meisner | |
| 5,165,949 A * | 11/1992 | Farnsworth | A21C 11/16 426/496 |
| 5,167,980 A | 12/1992 | Herod et al. | |
| 5,410,952 A | 5/1995 | Liou | |
| 5,492,706 A | 2/1996 | Cockings et al. | |
| 5,750,166 A * | 5/1998 | Schellhaass | A23P 20/12 426/629 |
| 5,862,744 A | 1/1999 | Hayes-Jacobson et al. | |
| 5,980,962 A | 11/1999 | Bracken et al. | |
| 5,997,932 A | 12/1999 | Hayes-Jacobson et al. | |
| 6,187,358 B1 | 2/2001 | Inoue et al. | |
| 6,194,017 B1 * | 2/2001 | Woodward | A21C 11/12 425/290 |
| 6,203,828 B1 | 3/2001 | Thota et al. | |
| 6,203,838 B1 | 3/2001 | Whitehouse | |
| 6,203,878 B1 * | 3/2001 | Davis | A47B 97/04 224/270 |

(Continued)

FOREIGN PATENT DOCUMENTS

| | | |
|---|---|---|
| ES | 2019036 | 5/1991 |
| WO | 2008028112 | 3/2008 |

OTHER PUBLICATIONS

S.P. Cauvain, et al., Laminated Products, Baking Products Solved; Elsevier, ISBN 185736187, p. 127.

(Continued)

*Primary Examiner* — Bhaskar Mukhopadhyay
(74) *Attorney, Agent, or Firm* — Honigman LLP

(57) ABSTRACT

A filled snack product includes a first sheet having a first surface. A plurality of filling lines are disposed upon the first surface of the first sheet. Each of the plurality of filling lines are spaced to define a void between each of the adjacent filling lines. A second sheet is disposed over the first sheet and secured to at least a portion of the first sheet to sandwich the plurality of spaced filling lines between the first and second sheets. A plurality of docking holes are disposed upon the first and second sheets. The plurality of docking holes and the plurality of spaced filling lines allow for the pinning of the first and second sheets at the voids disposed between the spaced filling lines and further for the release to steam and/or gas from the filled snack product during heating to minimize puffing of the filled snack product.

12 Claims, 5 Drawing Sheets

(56) References Cited

U.S. PATENT DOCUMENTS

| | | | |
|---|---|---|---|
| 6,217,919 B1 | 4/2001 | Takahara et al. | |
| 6,267,998 B1 | 7/2001 | Bauman | |
| 6,302,013 B1 | 10/2001 | Bataglia | |
| 6,351,927 B1 | 3/2002 | Righele et al. | |
| 6,355,293 B1 | 3/2002 | Thota et al. | |
| 6,858,241 B1 | 2/2005 | Kershman et al. | |
| 2003/0008032 A1 | 1/2003 | Walker et al. | |
| 2005/0249845 A1* | 11/2005 | Mihalos | A23L 7/122 426/275 |
| 2007/0275139 A1* | 11/2007 | Joerger | A23B 7/154 426/321 |
| 2009/0081335 A1 | 3/2009 | Ortiz et al. | |
| 2009/0110780 A1 | 4/2009 | Sanchez et al. | |
| 2011/0033577 A1 | 2/2011 | Molchan et al. | |

OTHER PUBLICATIONS

Y.H. Hui, Cracker Manufacture, Bakery Products: Science & Technology, John Wiley & Sons, ISBN 0470276320, p. 414, Blackwell Publishing.
PCT/US2010/044516 International Search Report dated May 23, 2011.

* cited by examiner

FILLED SNACK PRODUCT WITH SPACED FILLING LINES AND METHOD OF MAKING THE SAME

CROSS REFERENCE TO RELATED APPLICATIONS

This application is a Divisional of U.S. patent application Ser. No. 14/790,638, filed Jul. 2, 2015, which is a Continuation of U.S. patent application Ser. No. 12/850,805, now Abandoned, for Filled Snack Product With Spaced Filling Lines And Method Of Making The Same, filed on Aug. 5, 2010, which claims the benefit of U.S. Provisional Patent Application Ser. No. 61/232,086 for Snack Bar With Extruded Filling Lines And Method Of Making The Same, filed on Aug. 7, 2009, the entire contents of which are incorporated herein by reference.

BACKGROUND OF THE INVENTION

1. Field of the Invention

The subject invention relates to a filled snack product or snack bar, more specifically, a filled snack product having spaced filling lines applied from an extrusion plate and a method of making the same.

2. Description of the Prior Art

It has long been known to produce filled snack products of various compositions. For example, numerous filled dough products, such as filled snack products or hand-held pies with moist fruit, melted cheese, or gravy fillings, have been made for centuries and are commercially available. These bars have a filling that is disposed as a sheet, strip or pad of filling between two layers with sealed or stamped edges.

An example of one such product is disclosed in U.S. Patent Application Publication 2009/0110780 to Sanchez et al. The Sanchez publication discloses a laminated baked snack bar that includes a filling laminated between two layers of dough. A filling layer is disposed between the two layers to completely cover the surface of one of the layers and fill the area between the two layers when the other layer is placed on the first layer.

Another example of a product is disclosed in U.S. Pat. No. 6,203,828 to Thota et al. The Thota patent discloses a filled dough product, more particularly a cheese filled dough product. Multiple, continuous, filling lines are deposited longitudinally upon a dough sheet that is folded over itself to surround the filling lines and form a dough shell around each of the filling lines. The filling lines may be applied via an extruder. The top portion of the dough shell is crimped onto the bottom portion of the dough shell between each filling line and along a longitudinally-extending break line to seal the dough shell longitudinally between each of the filling lines.

Another example of a product is disclosed in U.S. Pat. No. 5,410,952 to Liou. The Liou patent discloses a method for making a noodle with stuffing. A first dough sheet is placed on a conveyor to be moved through the process line. The first dough sheet passes through a shaping tool to form a plurality of parallel grooves in the first dough sheet. The shaping tool consists of a pair of rollers, the first roller having a smooth surface and the second roller having a plurality of parallel grooves. The first dough sheet is then passed under a plurality of outlets which feed stuffing into the plurality of grooves on the first dough sheet. The first dough sheet is then covered with a second dough sheet to form a sandwiched dough sheet. A cutter is then used to sever the sheet into a plurality of noodles with stuffing.

SUMMARY OF THE INVENTION AND ADVANTAGES

In view of the above, the present invention is directed a filled snack product having a first sheet with a first flat surface. A plurality of filling lines are disposed upon the first flat surface of the first sheet. Each of the plurality of filling lines are spaced to define a void between the adjacent filling lines. A second sheet is disposed over the first sheet and secured to at least a portion of the first sheet to sandwich the plurality of spaced filling lines between the first and second sheets. A plurality of docking holes are disposed through the first and second sheets. The plurality of docking holes and the plurality of spaced filling lines allow for the pinning of the first and second sheets at the voids disposed between the spaced filling lines and further for the release of steam and/or gas from the filled snack product during heating to minimize puffing of the filled snack product. The precise placement of the filling lines and the voids therebetween further allows for the pinning of the second sheet to the first sheet in the voids by the docking holes. This pinning of the first and second sheets at the voids between spaced filling lines allows contact between the first and second sheets, thus creating a more durable seal or pin to minimize puffing of the filled snack product.

The present invention is further directed to a method for producing the filled snack product. The method begins by disposing a plurality of filling lines on a first flat surface of a first sheet. Each of the plurality of filling lines are spaced to define a void between the adjacent filling lines. A second sheet is then disposed over the first sheet to sandwich the plurality of filling lines between the first and second sheets and form a laminate. Next, the laminate is docked to create a plurality of docking holes for the release of steam and/or gas during heating. The laminate is then heated to form the filled snack product. The plurality of docking holes and the plurality of spaced filling lines allows for the pinning of the first and second sheets at the voids disposed between the spaced filling lines and further for the release of steam and/or gas from the laminate during heating to minimize puffing of the filled snack product. Again, this pinning of the first and second sheets at the voids between spaced filling lines allows contact between the first and second sheets, thus creating a more durable seal or pin to minimize puffing of the filled snack product.

The present invention further provides for an extrusion plate that disposes the spaced filling lines from an exit end of a manifold or extruder onto the first sheet of a filled snack product. The extrusion plate controls the flow of the filling lines from the exit end of the manifold and includes a plurality of spaced filling portions. Each of the filling portions define a plurality of openings. The plurality of openings are spaced from each other to dispose the plurality of spaced filling lines onto the first sheet.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
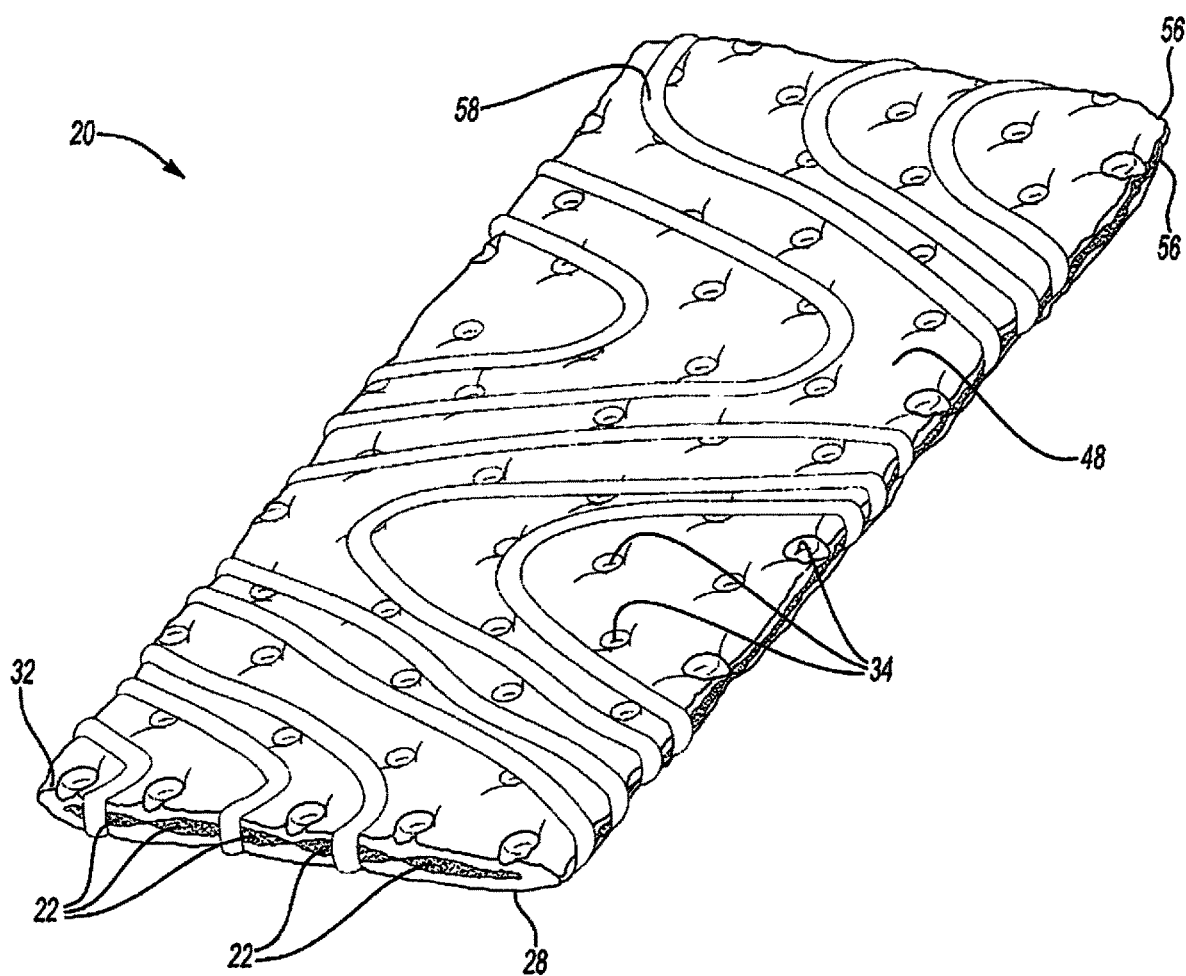
FIG. 1 is perspective view of a filled snack product according to the subject invention.
Figure 2:
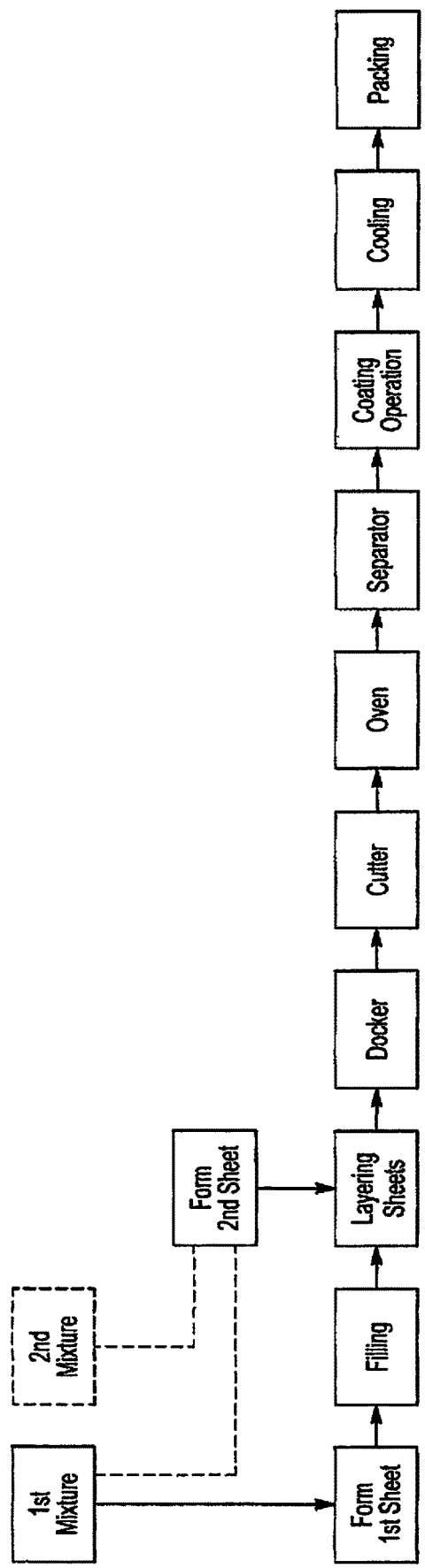
FIG. 2 is a schematic of an exemplary process according to the subject invention.
Figure 3:
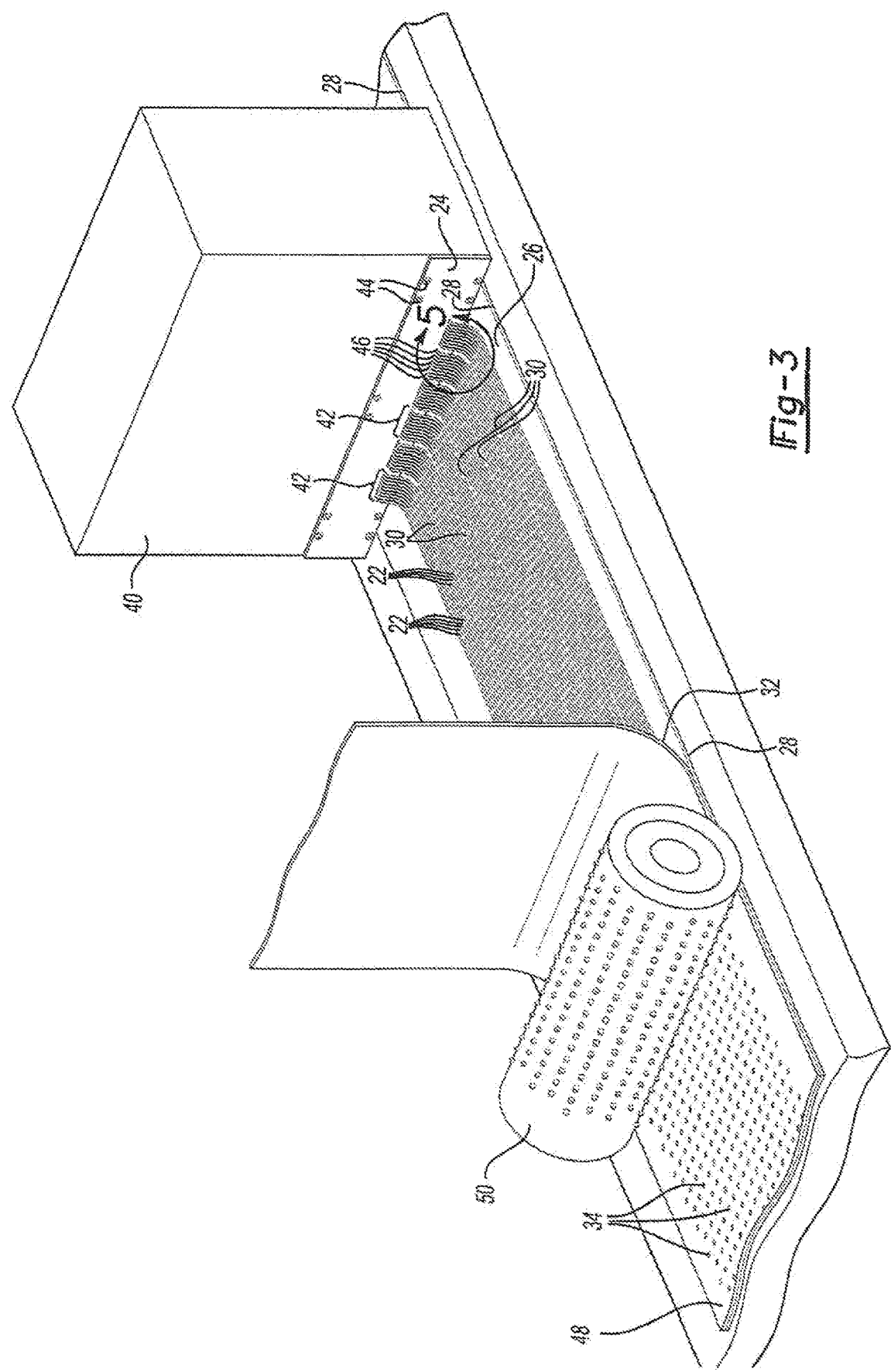
FIG. 3 is a partial perspective view showing a second sheet being layered over a first sheet after a plurality of filling lines have been disposed upon the first sheet according to the subject invention.
Figure 4:
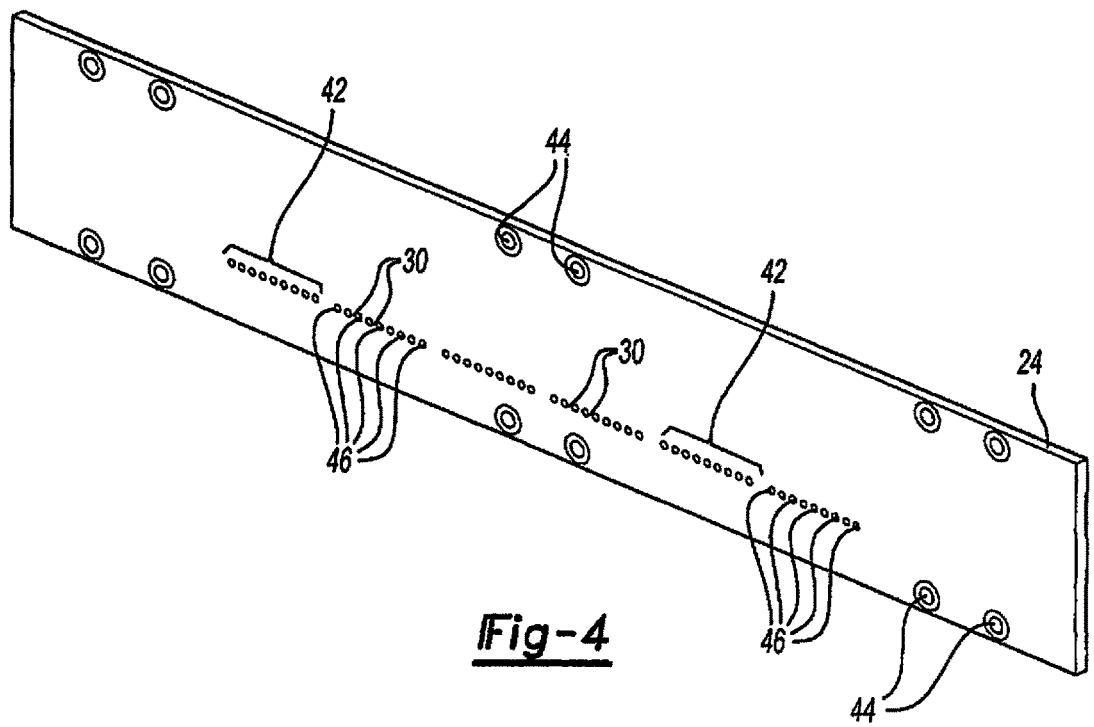
FIG. 4 is a perspective view of an extrusion plate according to the subject invention.
Figure 5:
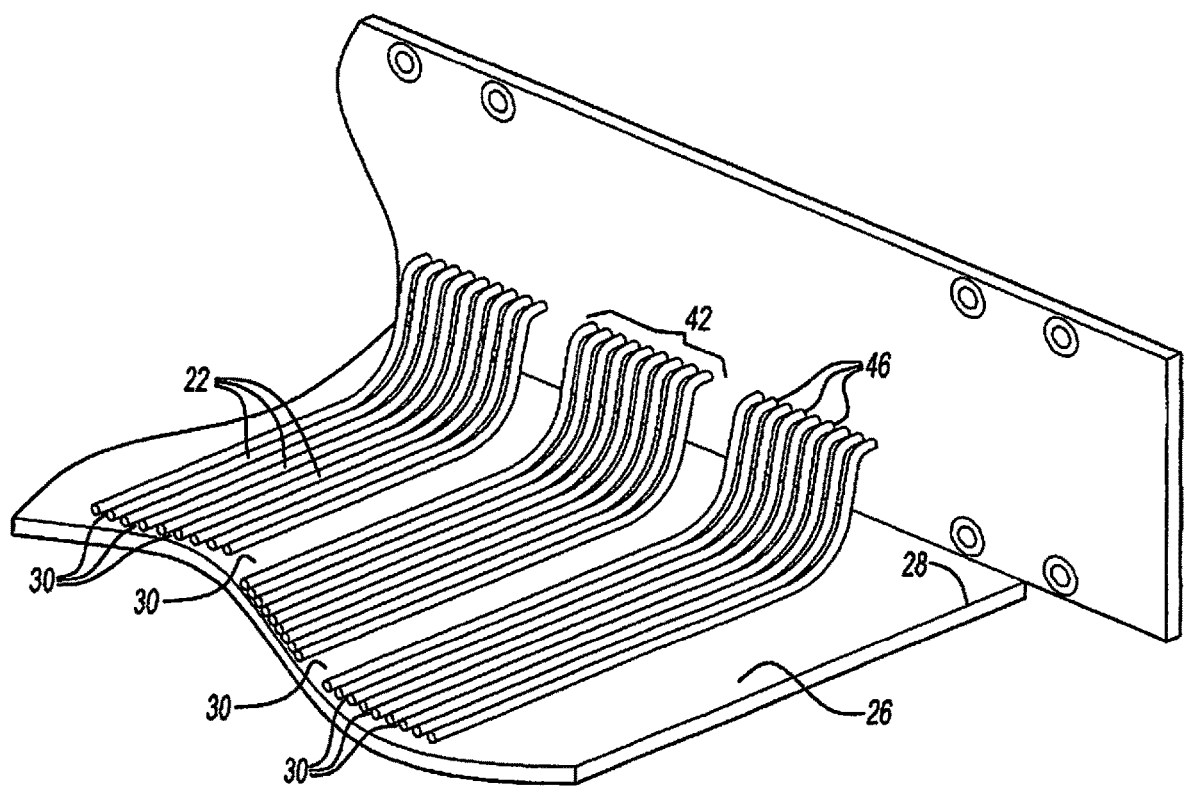
FIG. 5 is a partial perspective view of a plurality of spaced filing lines being distributed from an extrusion plate onto a first sheet as shown in FIG. 3.
Figure 6:
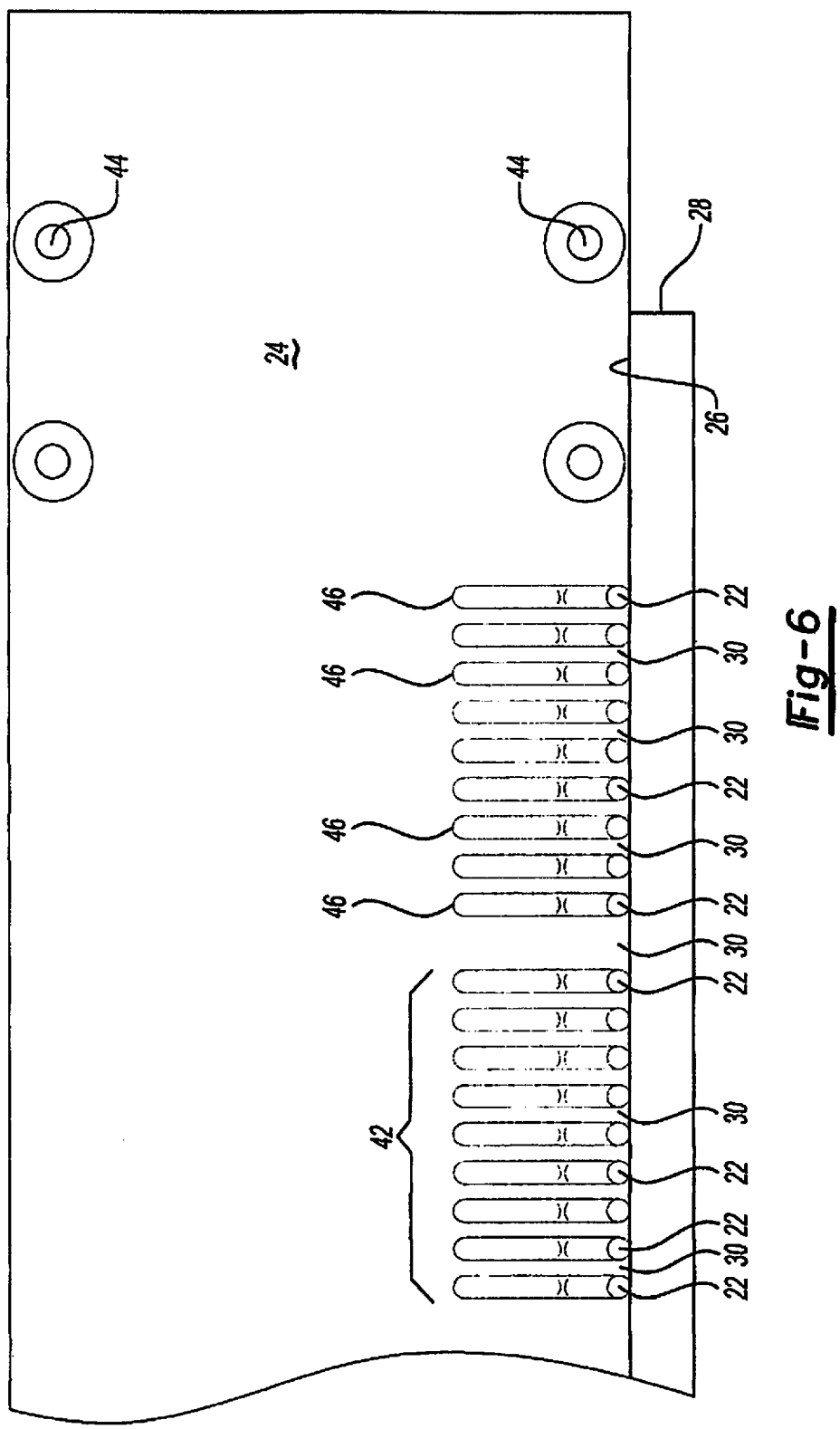
FIG. 6 is a partial front view of a plurality of spaced filling lines being distributed from an extrusion plate onto a first sheet as shown in FIG. 5.

Referring to the Figures, wherein like numerals indicate corresponding parts throughout the several views, a filled snack product or snack bar 20, more specifically, a filled snack product 20 having spaced filling lines 22 applied from an extrusion plate 24 is generally shown.

In summary, the filled snack product 20 includes a plurality of filling lines 22 that are disposed upon a first flat surface 26 of a first sheet 28. Each of the plurality of filling lines 22 are spaced to define a void 30 between each of the adjacent filling lines 22. A second sheet 32 is disposed over the first sheet 28 and secured to at least a portion of the first sheet 28 to sandwich the plurality of spaced filling lines 22 between the first and second sheets 28, 32. A plurality of docking holes 34 are disposed upon the first and second sheets 28, 32. The plurality of docking holes 34 and the plurality of spaced filling lines 22 allow for the release of steam and/or gas from the filled snack product 20 during heating to minimize puffing of the filled snack product 20. The precise placement of the filling lines 22 and the voids 30 therebetween further allows for the pinning of the second sheet 32 to the first sheet 28 in the voids 30 by the docking holes 34. This pinning of the first and second sheets 28, 32 at the voids 30 allows contact between the first and second sheets 28, 32, thus creating a more durable seal or pin to minimize puffing of the filled snack product 20.

To begin, a first mixture is sheeted to form a first sheet 28. A second sheet 32 is also formed from either the first mixture or a separate and distinct second mixture. In the exemplary embodiment, the mixture is a dough based mixture, particularly a cracker dough based mixture, although any food product that can be sheeted may be used, including, but not limited to granola mixtures.

The first and second sheets 28, 32 may be formed in any manner, such as sheeting or extruding. The most industrially-efficient means for forming sheets 28, 32 is to place a prepared mixture or dough in a hopper that feeds the mixture through rollers, or, ideally, a series of rollers, so as to reduce the dough from one large mass to a sheet of desired thickness. This technique is known in the art, and adjusting the thickness of the dough so as to result in the physical attributes desired is also within the skill of the art. Sheeting may be accomplished manually as well, although such a process is ordinarily done on a small scale. Large scale dough sheeting may be accomplished via vertical or horizontal sheeting apparati, and may include traditional lamination during the sheeting process. The doughs may be made to have dual or multi-colors or flavors in any given sheet. Layering may also be accomplished via large scale multi-hopper sheeting mechanisms or any other techniques known in the art. Multiple layers of dough are within the scope of the present invention.

Doughs or mixtures useful in the present invention can be any type of edible sheetable or extrudable dough, including, but not limited to, laminated or non-laminated cracker dough, cracker dough with some sweeteners added, cracker dough that is leavened, cracker dough that has been fermented, cracker dough with flavorings and/or cracker dough with inclusions or toppings. The dough can be yeast dough, straight dough, or sponge dough. Ideally, the dough is formulated so that it may be sheeted in an industrial sheeting machine.

Mixtures or doughs useful in the present invention are made according to methods generally known in the art, and include mixing flour, fat and moisture (ordinarily water) and most often, salt. Optional ingredients, such as sweeteners, flavors, inclusions, colors, nutritional supplements, leavening agents, sulfites, and dough conditioners, such as emulsifiers, reducing agents, and/or oxidizing agents may be added as well. The present invention includes the use of the same mixture for the entire dough component in the filled snack product 20, but may also include combinations of mixtures in a composition, for example two doughs or mixtures each having a different type (color, flavor, inclusions, processing differences, etc.).

Once formed, the first sheet 28 is generally ran along a conveyor or any other means for moving sheets known in the art. A plurality of filling lines 22 are disposed on the first flat surface 26 of the first sheet 28. Each of the plurality of filling lines 22 are spaced to define a void 30 between each of the adjacent filling lines 22. The use of filling lines 22 allows for precise positioning of the filling without necking, stretching or breaking. In the exemplary embodiment, the filling lines 22 are disposed from an extruder or manifold 40 having an extrusion plate 24 disposed on the exit end of the manifold 40. In the exemplary embodiment, an Oakes or Reiser manifold 40 may used to distribute the filling, but any extruder 40, stringer, or manifold 40 known in the art may be used. The filling lines 22 can be any filling known in the art, particularly any filling have particulates within. Such fillings include, but are not limited to fruit, pudding, and cream fillings.

The extrusion plate 24 disposes the filling lines 22 from the exit end of the manifold 40 onto the first sheet 28. The plate 24 is made from stainless steel, but may be made from any material known in the art. The extrusion plate 24 includes a plurality of attachment holes 44 for securing the plate 24 to the manifold 40, but the plate 24 may be secured to the manifold 40 by any means known in the art.

The extrusion plate 24 includes a plurality of spaced filling portions 42. Each of the filling portions 42 define a plurality of openings 46. The plurality of openings 46 are spaced from each other to dispose the plurality of spaced filling lines 22 onto the first sheet 28 in a spaced manner to define the voids 30. The spacing between the adjacent filling portions 42 may be equal to the spacing between the adjacent openings 46, but spacing may vary based on the desired filled snack product 20. In the exemplary embodiment, the spacing between the adjacent filling portions 42 is greater than the spacing between the adjacent openings 46. This extra spacing results in a larger area for the first and second sheets 28, 32 to be secured to one another without the interference of the filling lines 22. In an alternative embodiment, a more complex pattern of filling lines 22 may be disposed on the first sheet 28. In such an embodiment, multiple extruders or a dual extruder 40, having fillings that differ from each other may be used such that the extruder 40 may distribute different filling from the openings 46 disposed in the extrusion plate 24 to create a filled snack product 20 with multiple fillings. The fillings may differ in flavor, content, size, or any other difference known in the art. In the exemplary embodiment, adjacent spaced openings 46 could have different filling lines 22 disposed therefrom, such that the filling lines 22 would alternate across the filled snack product 20, resulting in a filled snack product 20 having multiple flavors.

The plurality of openings 46 in the extrusion plate 24 are generally circular, but may be square, triangular, or any other geometry known in the art. The openings 46 are large enough to allow fillings having particulates or skins within to be extruded from the plate 24. In the prior art, fillings having particulates or skins within have been extruded in sheets or pads. These sheets or pads have been deposited on first sheets 28 via a narrow slit in the extruder 40. This narrow slit can easily clog and results in a non-uniform weight distribution of filling. In the exemplary embodiment, the openings 46 are about 0.079 inches, but may be any size and shape. The size of the openings 46 depends on the filling weight and ratio required in the finished filled snack product 20. The openings 46, in applying the filling lines 22, allow for a more uniform weight distribution of filling over the first sheet 28.

After the filling lines 22 have been disposed onto the first sheet 28, the second sheet 32 is placed over the first sheet 28 to sandwich the plurality of filling lines 22 between the first and second sheets 28, 32 and form a laminate 48. The second sheet 32 is fed via a second conveyor to cover the first sheet 28 and filling lines 22 disposed thereon, but may be fed by any method known in the art.

After the second sheet 32 has been disposed over the first sheet 28, the laminate 48 moves along the conveyor to a docker 50. The docker 50 creates a plurality of docking holes 34 in the laminate 48 for the release of steam and/or gas from the first and second sheets 28, 32 during heating. In the exemplary embodiment, the docker 50 is a rotary docker 50 having a plurality of pegs that extend outwardly to engage the laminate 48 and form the docking holes 34. The docker 50 may be a rotary docker 50 or any other docker 50 known in the art. The plurality of docking holes 34 and the plurality of spaced filling lines 22 allow for the release to steam and/or gas from the filled snack product 20 during heating to minimize puffing of the filled snack product 20. The present invention allows for docking through the first and second sheets 28, 32 and filling lines 22 disposed therebetween, for pinning of the second sheet 32 to the first sheet 28, and for minimizing or eliminating puffing. In the exemplary embodiment, the docking holes 34 are disposed in a random pattern on the laminate 48 with a plurality of the docking holes 34 being located at voids 30 between the plurality of filling lines 22 to pin the first and second sheets 28, 32. In an alternative exemplary embodiment, the docking holes 34 may be placed in a precise pattern so that each of the docking holes 34 will be located at a void 30 between the plurality of filling lines 22 to pin the first and second sheets 28, 32. In yet another alternative exemplary embodiment, the docking may be a combination of placing the docking holes 34 in both precise and random patterns. The pinning of the first and second sheets 28, 32 at the voids 30 allows for contact between the first and second sheets 28, 32, thus creating a more durable seal or pin to minimize puffing of the filled snack product 20.

The laminate 48 may then be divided into a plurality of individual filled snack products 20. Each of the individual filled snack products 20 have a plurality of filling lines 22 disposed therein. The bars may be divided using a cutter or any known means in the art for dividing a sheet into individual pieces. In the exemplary embodiment, the cutter is a rotary cutter, but any cutter known in the art may be used. The cutter may be used to secure at least a portion of the second sheet 32 to the first sheet 28 prior to the heating of the laminate 48. The cutter crimps the second sheet 32 to the first sheet 28 along a longitudinally-extending break line or peripheral portion to seal the second sheet 32 to the first sheet 28. In the exemplary embodiment, the second sheet 32 is secured to the first sheet 28 at the voids 30 between spaced filling lines 22. Securing the first and second sheets 28, 32 at the voids 30 allows contact between the first and second sheets 28, 32, thus creating a more durable seal. In an alternative embodiment, the sheets 28, 32 may be divided without sealing the periphery 54 to create a plurality of filled snack products 20 having a more tart like appearance as is known in the art.

The first and second sheets 28, 32 each define a periphery 54. The second sheet 32 is secured to the first sheet 28 along at least a portion of the periphery 54 to sandwich the plurality of spaced filling lines 22 between the first and second sheets 28, 32. In the exemplary embodiment, each of the peripheries 54 are rectangular, but may be any shape known in the art. When the peripheries 54 are rectangular, the second sheet 32 is secured to the first sheet 28 along opposing peripheral edges 56 to sandwich the plurality of spaced filling lines 22 between the first and second sheets 28, 32. A portion of the plurality of filling lines 22 may be exposed between the first and second sheets 28, 32 at opposing ends of the first and second sheets 28, 32. In an alternative embodiment, the peripheries 54 of the filled snack products 20 may include a scalloped edge.

The laminate 48 is moved along the conveyor and heated to form the filled snack product 20. Again, it should be noted that the pinning of the first and second sheets 28, 32 at the voids 30 between spaced filling lines 22 results in a product with minimal puffing. Heating includes, baking and toasting, or any other method of heating known in the art. In the exemplary embodiment, an oven, such as a DGF oven, recirculated oven, impingement oven, infrared oven, or any other oven known in the art may be utilized to heat the filled snack product 20. The desired temperature and time range for heating is dependant upon the mixtures used in the first and second sheets 28, 32 and desired texture of the finished food product, and is known by one skilled in the art.

Following heating, the laminate 48 is separated into the plurality of individual filled snack products 20. The laminate 48 is separated using a separator or any other method of separating known in the art. The separator breaks the laminate 48 at the longitudinally-extending break lines where the rotary cutter has secured the first and second sheets 28, 32 to each other.

The individual filled snack products 20 may then be cooled and packaged for delivery. The cooling of the filled snack products 20 may be accomplished by a dryer or cooler, exposing the filled snack products 20 to ambient air, or an other method of cooling known in the art. Optionally, prior to cooling and packaging the filled snack products 20, the filled snack products 20 may be coated with an additive 58.

In an exemplary embodiment, a coating operation may be used in applying the additive 58 to the outer surface of the filled snack products 20. A drizzlier or sprayer could be used to apply the additive 58 as the filled snack product 20 moves along a conveyor belt. The additive 58 may include, but is not limited to, frosting, icing, vitamins, edible particulates, flavorings, artificial sweeteners, dehydrated fruits, nuts, chocolate, or compound coatings. The addition of the additive 58 may require a final cooling or drying step in order to cool the filled snack products 20 prior to being packaged. The cooling of the additive 58 may be accomplished by a cooler or dryer, exposing the filled snack products 20 to ambient air, or an other method of cooling known in the art.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A filled snack product comprising:
   a first sheet of a first mixture having a first flat surface;
   a plurality of filling lines disposed upon said first flat surface of said first sheet, each of said plurality of filling lines being spaced to define a void between adjacent ones of said filling lines;
   a second sheet of a second mixture disposed over said first sheet to sandwich said plurality of spaced filling lines between said first sheet and said second sheets;
   a first plurality of docking holes each extending through the first sheet and the second sheet at the void formed between the adjacent ones of said filling lines to secure said second sheet directly to said first sheet; and
   a second plurality of docking holes each extending through the first sheet, one of the filling lines, to secure said second sheet to said first sheet through the one of the filling lines.

2. The filled snack product as set forth in claim 1 wherein said first sheet and said second sheets each define a periphery and said second sheet is secured to said first sheet along at least a portion of said periphery to sandwich said plurality of spaced filling lines between said first sheet and said second sheets.

3. The filled snack product as set forth in claim 2 wherein each of said peripheries are rectangular and said second sheet is secured to said first sheet along opposing peripheral edges to sandwich said plurality of spaced filling lines between said first sheet and said second sheets.

4. The filled snack product as set forth in claim 3 wherein a portion of said plurality of filling lines is exposed between said first sheet and said second sheet at opposing ends of said first sheet and said second sheets.

5. The filled snack product as set forth in claim 1 further including an additive for placement on an outer surface of said filled snack product.

6. The filled snack product as set forth in claim 5 wherein said additive is one of frosting, icing, vitamins, edible particulates, flavorings, artificial sweeteners, dehydrated fruits, nuts, chocolate, or compound coatings.

7. The filled snack product as set forth in claim 1 wherein at least one of said first mixture and said second mixture is a dough based mixture.

8. The filled snack product as set forth in claim 1 wherein said first mixture and said second mixtures are the same mixture.

9. The filled snack product as set forth in claim 1 wherein said plurality of filing lines include at least two different flavored filling lines.

10. The filled snack product as set forth in claim 1 wherein said plurality of filling lines are the same.

11. The filled snack product as set forth in claim 5, wherein the additive includes a plurality of additive lines disposed on the outer surface of said filled snack product.

12. The filled snack product as set forth in claim 1, wherein the first plurality of docking holes and the second plurality of docking holes form holes in the first sheet and the second sheet having same diameter.

\* \* \* \* \*